United States Patent

Sartori et al.

[11] Patent Number: 5,918,521
[45] Date of Patent: *Jul. 6, 1999

[54] BIFURCATED HOLDOWN SHOE FOR RADIAL ARM SAWS

[76] Inventors: James A. Sartori, 228 Countryside La., Williamsville, N.Y. 14221; Michael J. Sartori, 1721 Billington Rd., East Aurora, N.Y. 14052

[*] Notice: This patent issued on a continued prosecution application filed under 37 CFR 1.53(d), and is subject to the twenty year patent term provisions of 35 U.S.C. 154(a)(2).

[21] Appl. No.: 08/733,443

[22] Filed: Oct. 18, 1996

Related U.S. Application Data

[63] Continuation of application No. 08/335,503, Nov. 11, 1994, abandoned.

[51] Int. Cl.⁶ .................................................. B26D 7/22
[52] U.S. Cl. ........................ 83/440.2; 83/441; 83/447; 83/450; 83/478; 83/DIG. 1
[58] Field of Search ................... 83/478, 440.2, 83/450, 447, DIG. 1, 468.5, 814, 475, 486.1, 485, 486, 441

[56] References Cited

U.S. PATENT DOCUMENTS

| | | | |
|---|---|---|---|
| 673,473 | 5/1901 | Peuckert | 83/475 |
| 768,663 | 8/1904 | Jackson | 83/440.2 |
| 899,567 | 9/1908 | Schubert | 83/450 |
| 1,352,519 | 9/1920 | Laserson | 83/485 |
| 2,523,834 | 9/1950 | Lawson | 83/440.2 |
| 2,659,400 | 11/1953 | Petersen | 83/478 |
| 2,796,931 | 6/1957 | Kuenn et al. | 83/475 |
| 2,799,303 | 7/1957 | Lee | 83/440.2 |
| 3,101,104 | 8/1963 | Sullivan | 83/447 |
| 3,995,515 | 12/1976 | White | 83/441 |
| 4,033,218 | 7/1977 | Donatelle | 83/DIG. 1 |
| 4,294,151 | 10/1981 | Lemus | 83/478 |
| 5,287,780 | 2/1994 | Metzger, Jr. et al. | 83/486.1 |
| 5,301,579 | 4/1994 | Shiotani et al. | 83/450 |
| 5,353,670 | 10/1994 | Metzger, Jr. | 83/DIG. 1 |

FOREIGN PATENT DOCUMENTS

| | | | |
|---|---|---|---|
| 11672 | 2/1924 | Netherlands | 83/478 |

*Primary Examiner*—Kenneth E. Peterson
*Attorney, Agent, or Firm*—Phillips, Lytle, Hitchcock, Blaine & Huber LLP

[57] ABSTRACT

A bifurcated holdown shoe for radial arm saw mounted to the saw guard of the radial arm saw such that the lower surface of the holdown shoe is mounted at a distance above the radial arm saw saw table corresponding to the height of a work piece to pass underneath the holdown shoe and be cut by the radial arm saw. The holdown shoe includes an arm portion which is bifurcated into two arms separated by a channel. A portion of the saw blade is held within the channel. The holdown shoe holds a work piece vertically steady against the saw table immediately adjacent the saw blade during a rip-cut, thus reducing the occurrence of kick-back.

6 Claims, 6 Drawing Sheets

BIFURCATED HOLDOWN SHOE FOR RADIAL ARM SAWS

This application is a continuation of application Ser. No. 08/335,503 filed on Nov. 11, 1994, now abandoned.

TECHNICAL FIELD

The present invention relates generally to an accessory for radial arm saws that assists in their safe and accurate operation, and, more particularly, to a device which securely holds a work piece being rip-cut by a radial arm saw against the saw table to prevent the work piece from being kicked-back toward the operator, and to provide a more precise cut.

BACKGROUND OF THE INVENTION

Most wood workers distrust radial arm saws when rip-cutting. Radial arm saws are prone to kicking-back the work piece when rip-cutting unless it can be kept under firm control. Keeping such firm control can become quite hazardous as the work piece becomes narrow, and especially when the work piece becomes shorter. The operator is at risk using these smaller work pieces as his hands necessarily must work nearer to the saw blade in a cramped area with restricted visibility. These concerns are intensified when working with course grain hardwood such as oak. In fact, one radial arm saw currently sold has a warning against performing less than half-inch wide cuts.

Prior devices such as RIPSTRATE® or SHOPHELPER® attempt to overcome these short comings. However, neither is satisfactory as each is attached to the guide fence, limits the minimum cut width or is remote from the critical cutting area. Other devices are available which utilize spring fingers positioned before and after the blade. These devices have metallic components adjacent to the saw blade which presents an additional hazard if they become lose and strike the rotating saw blade. In addition, these devices are ineffective in the outrip position, especially if the setting is wide. Accordingly, there does not exist a device which holds down a work piece in the critical area where the saw is actually cutting. This is especially important if the work piece is very short and the cut-width is narrow.

All radial arm saws are equipped with pointed pivotal pawls on the exit side of the saw blade which must be adjusted to the thickness of the work piece being sawed. Their function is to restrain the work piece if it beings to travel in the wrong direction (i.e., back towards the operator). The pawls are usually four to six inches behind the cutting area of the saw blade, and are of little value when rip-cutting short pieces. Also, adjusting the pawls is an additional step after adjusting the saw blade, and is easy to forget.

In addition, a cross-cut is occasionally required when rip-cutting. Each prior art device must be removed or repositioned to allow adjustment from rip-cutting to cross-cutting. To return to rip-cutting, each prior art device must then be reinstalled or repositioned. It would be beneficial to provide a hold down device that does not significantly hinder adjustment from rip-cutting to cross-cutting.

The device of U.S. Pat. No. 4,532,841 refers to the front lip of a saw blade guard to a radial arm saw as being a work piece hold down. However, as soon as the end of the work piece passes this lip, it can no longer perform the hold down function. The danger of kick-back is greatest near the end of the cut. Therefore, the '841 patent does not provide hold down function at the most critical point of the rip-cutting operation.

The prior art hold down devices consist of cogged wheels, springs, clamps, rods and adjusting hardware. They are expensive and time consuming to install, and thus generally unacceptable to the average wood worker.

Therefore, the present invention provides a holdown shoe which holds a work piece firmly against the saw table immediately adjacent the saw blade during a rip-cut, and which does not hinder adjustment of the radial arm saw from the rip-cutting position to the cross-cutting position. In addition, the present invention is simple and inexpensive, compatible with all designs of saw guards currently available, can be retro-fitted to older saws, and provides a radial arm saw with the ability to make very small (i.e., less than a quarter inch) rip-cuts.

BRIEF SUMMARY OF THE INVENTION

With parenthetical reference to the various drawing figures, the present invention is a bifurcated holdown shoe (20). The holdown shoe comprises a head portion (21), a body portion (22) and an arm portion (23). In one embodiment, the head portion includes two parallel slits (26) in which pawls (24) are rotatably mounted about a rod (25). Mounted to the body portion is a bracket (28) which is also mounted to a saw guard (30) by a wing bolt (31). The arm portion is bifurcated into two forks (31 and 32) which are separated by a channel (33). The holdown shoe can be rotated about the wing bolt until its bottom surface is generally parallel to a work piece (38) and presses the work piece against the saw table (39). In this position, the work piece will pass sequentially under the head portion, the body portion and then the arm portion, where it will be cut by a saw blade (35) which rests in the channel. The holdown shoe controls kickback forces (40, 41 and 42) generated by the saw blade which might otherwise force the work piece back towards the operator.

Accordingly, the general object of the invention is to provide a holdown shoe which controls kick-back forces generated during the rip-cutting of a work piece.

Another object of the invention is to hold down the work piece at a position very close to the saw blade.

Another object of the invention is to provide a device which is simple to use and inexpensive.

Another object of the invention is to provide a device which allows very thin rip-cuts of a work piece.

Another object of the invention is to provide a holdown for rip-cutting which does not interfere with adjusting the radial arm saw to cross-cut.

Still another object of the invention is to provide a holdown shoe which will not shatter, splinter, or damage the saw blade upon contact with the saw blade.

DETAILED DESCRIPTION OF THE INVENTION

Figure 1:
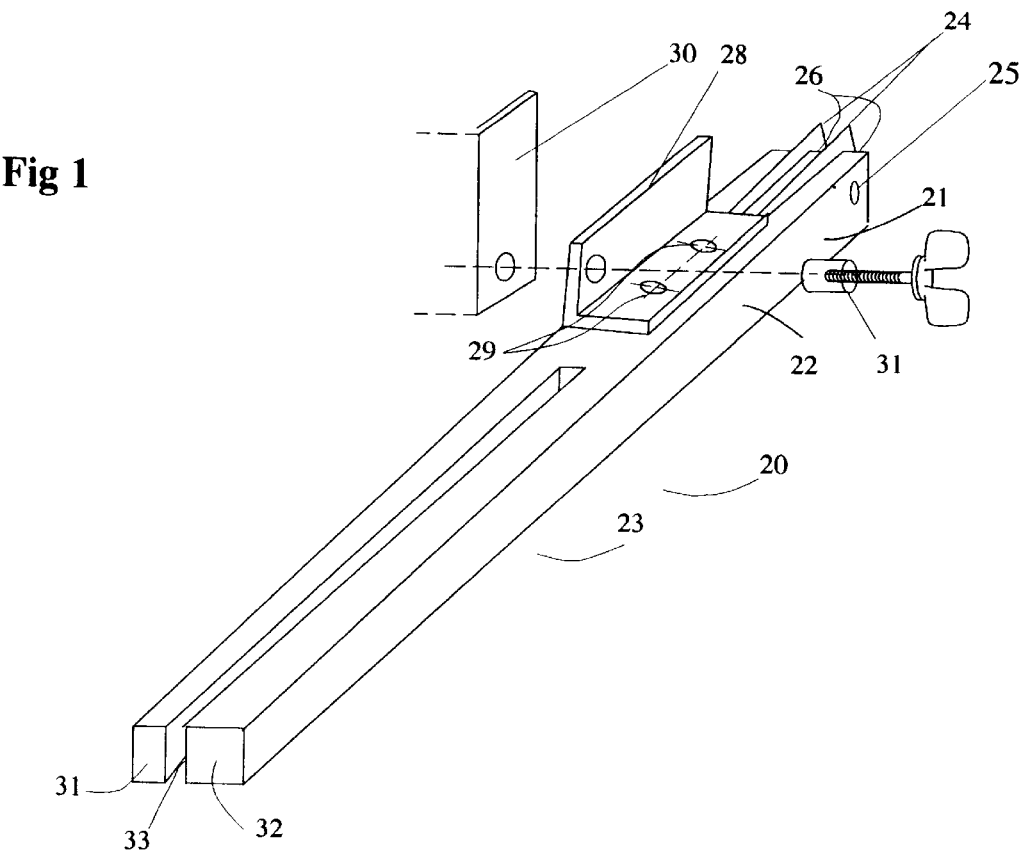
FIG. 1 is a perspective view of the invention having pointed pawls.

At the outset, it should be clearly understood that like reference numerals are intended to identify the same structural elements, portions or surfaces consistently throughout the several drawings figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Adverting to FIG. 1, the holdown shoe 20 is shown to generally comprise a head portion 21, a body portion 22 and an arm portion 23. Portions 21, 22 and 23 are made of any rigid non-friable material, such as polypropylene. Pointed pawls, severally indicated at 24, are rotatably mounted on rod 25 within parallel slots, severally indicated at 26.

A bracket 28 is mounted by screws, severally indicated at 29, to body portion 22. Bracket 28 is also mounted to the saw guard 30 of a radial arm saw (not shown) by wing bolt 31. The orientation of holdown shoe 20 can be adjusted relative to saw guard 30 by loosing wing bolt 31, rotating holdown shoe 20 about wing bolt 31, and then tightening wing bolt 31 to fix the position of holdown shoe 20.

Arm portion 23 is bifurcated into a first fork 31 and second fork 32 which are separated by a channel 33. Channel 33 is sized to accept the width of a saw blade with little clearance. This provides greater stability for the work piece held down.

Adverting to FIG. 15, the mounting of holdown shoe 20 to saw guard 30 may be better understood. Guide fence 34 is positioned generally parallel to saw blade 35. Saw guard 30 surrounds the upper portion of saw blade 35. Holdown shoe 20 is mounted to saw guard 30 such that saw blade 35 occupies channel 33 between forks 31 and 32, and forks 31 and 32 are completely underneath saw guard 30.

Figure 3:
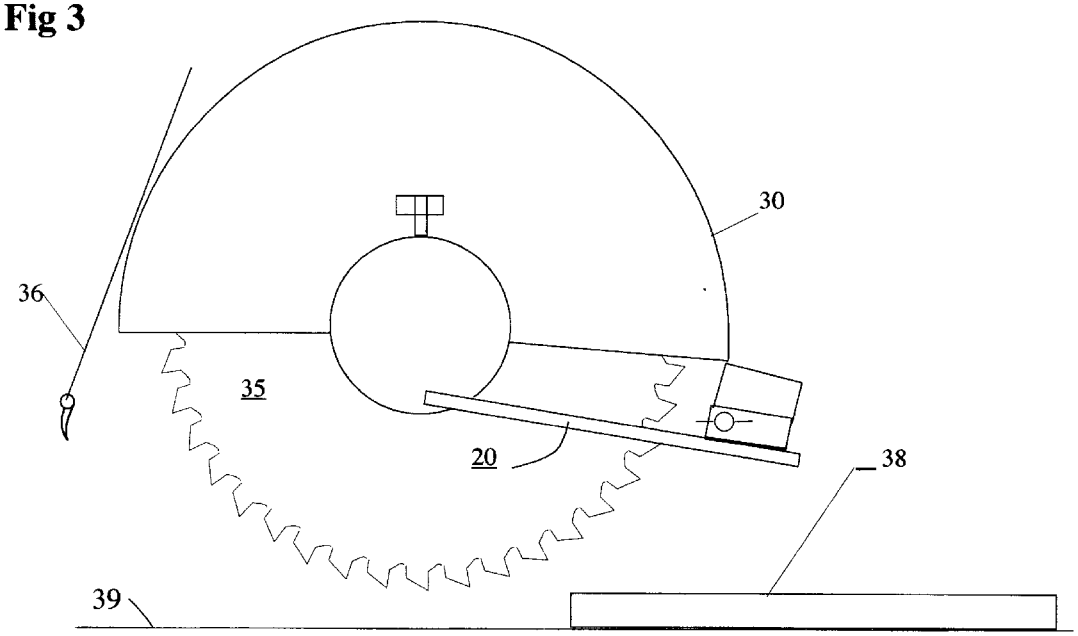
FIG. 3 is an elevation view of the invention mounted to the saw guard of a radial arm saw.
Figure 4:
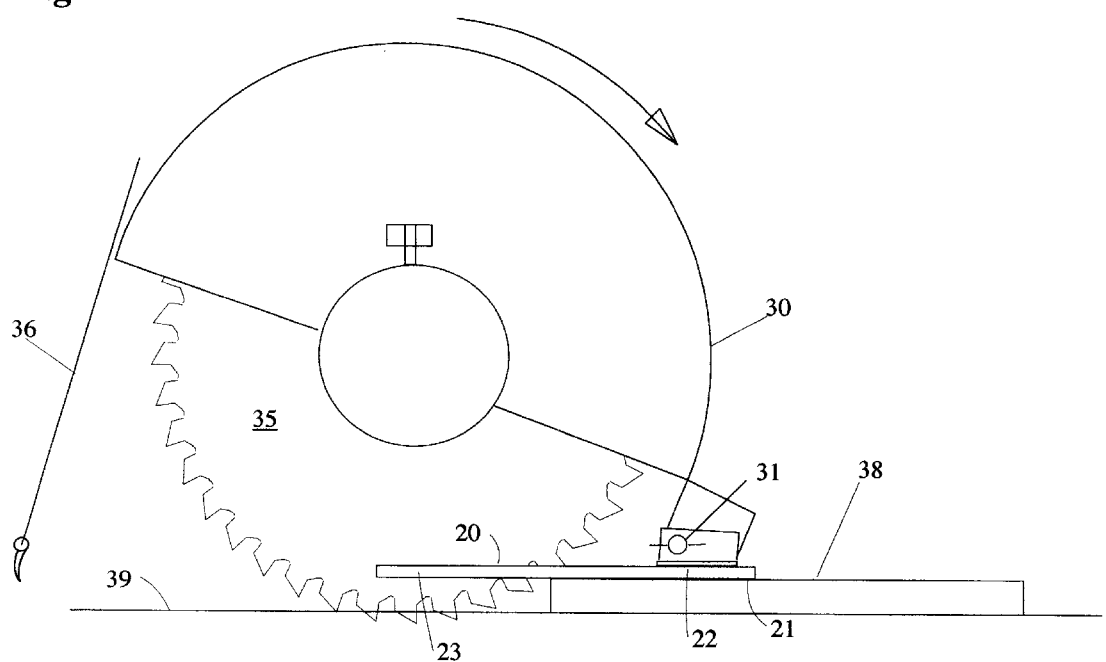
FIG. 4 is similar to FIG. 3 and shows the invention adjusted to hold down a work piece of a specific thickness.
Figure 5:
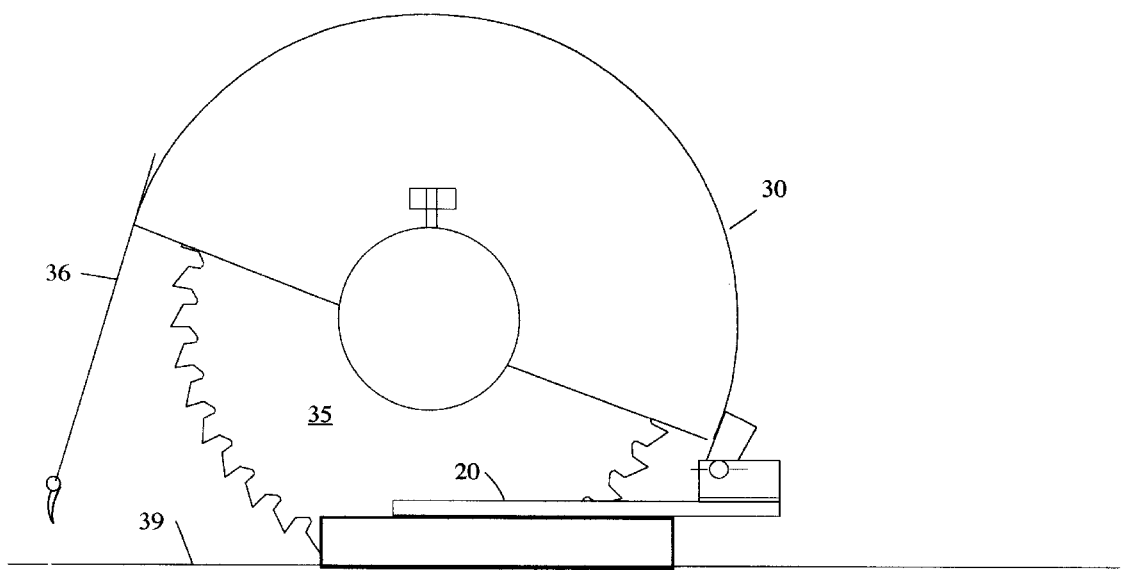
FIG. 5 is similar to FIG. 4 and shows the work piece advanced into the saw blade and partially rip-cut.

FIGS. 3, 4 and 5 show holdown shoe 20 in operation. Holdown shoe 20 is mounted to saw guard 30. The upper portion of saw blade 35 is covered by saw guard 30 to provide protection for the operator. Also mounted to saw guard 30 is exit pawl 36 positioned behind saw blade 35. When in operation, saw blade 35 will rotate counterclockwise. A work piece 38 is positioned on saw table 39.

Adverting now to FIG. 4, saw guard 30 is rotated clockwise until holdown shoe 20 contacts work piece 38. Wing bolt 31 is loosened and holdown shoe 20 is rotated until the bottom surface of head portion 21, body portion 22 and arm portion 23 are generally parallel to and contact the top surface of work piece 38. Wing bolt 31 is then tightened to fixedly position holdown shoe 20 to saw guard 30. Saw guard 30 is also fixedly positioned. Exit pawl 36 is adjusted such that exiting work piece 38 will strike exit pawl 38.

FIG. 5 shows work piece 38 partially cut by saw blade 35. As work piece 38 advances under holdown shoe 20, it contacts rotating saw blade 35 and is cut. Because saw blade 35 is rotating counterclockwise, it can impart a rightward and upward force on work piece 38. If this force is uncontrolled, work piece 38 may kick-back toward the operator. Holdown shoe 20 controls the tendency of work piece 38 to kick-back. Work piece 38 is held vertically steady between fixedly positioned holdown shoe 20 and saw table 39.

Figure 6:
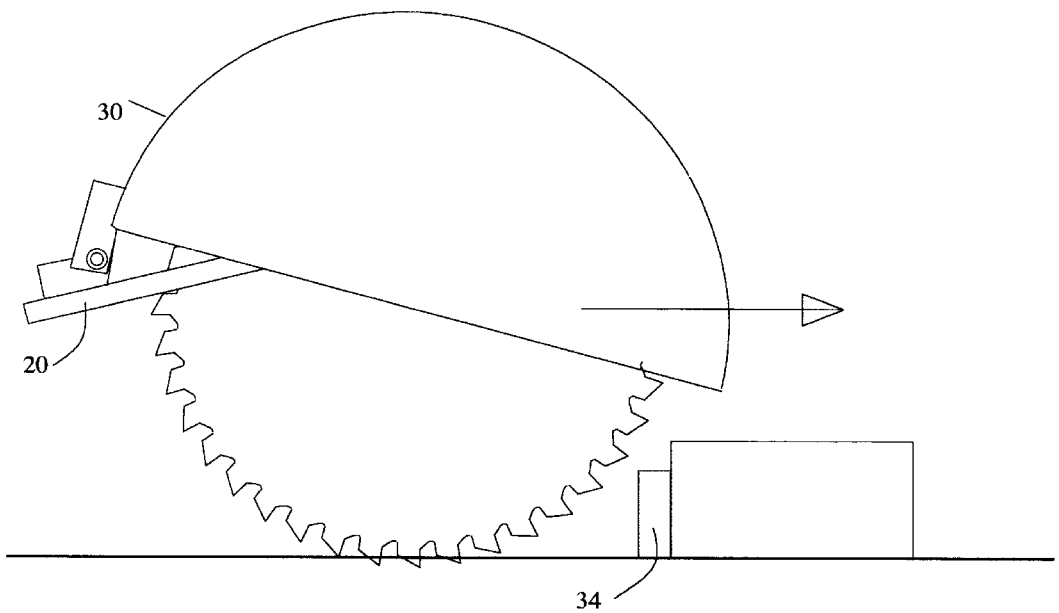
FIG. 6 shows the invention mounted to the saw guard of a radial arm saw, and said radial arm saw configurated to cross-cut.

Importantly, holdown shoe 20 does not hinder the use of saw blade 35 for cross-cutting. FIG. 6 shows saw blade 35, saw guard 30 and holdown shoe 20 positioned to cross-cut. To reach this positioning, wing bolt 31 was loosened and holdown shoe 20 rotated such that arm portion 23 enters saw guard 30, and will not interfere with guide fence 34 and work piece 38 during cross-cutting.

FIGS. 7–10 show pawls 24 assisting holdown shoe 20 in preventing kick-back.

Figure 7:
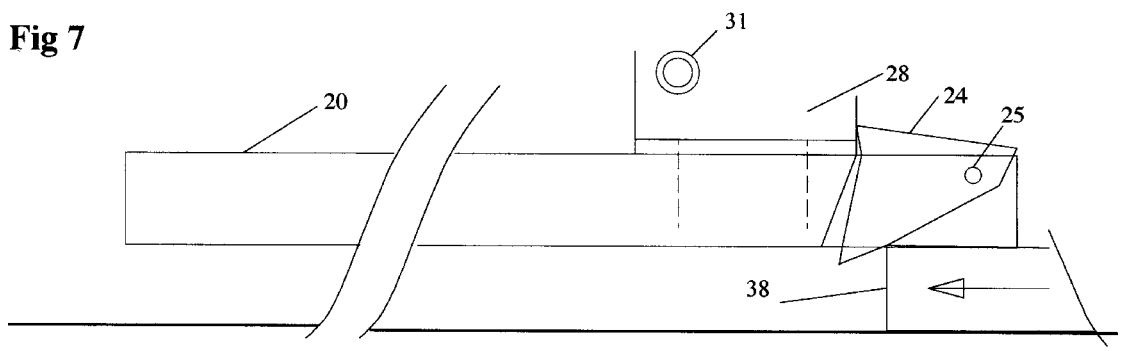
FIG. 7 is a schematic elevation view of the holdown shoe having pointed pawls.
Figure 8:
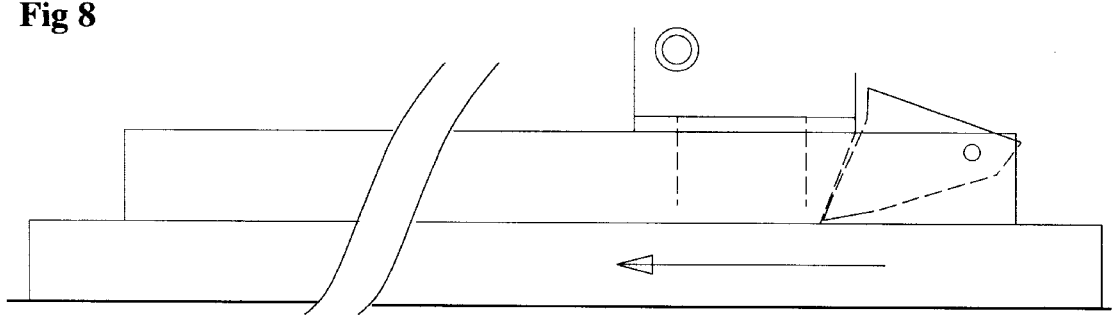
FIG. 8 is similar to FIG. 7 and shows a work piece advancing under the pawls.

Adverting first to FIGS. 7 and 8, as work piece 38 travels from right to left, it rotates pawls 24 clockwise about rod 25.

Figure 9:
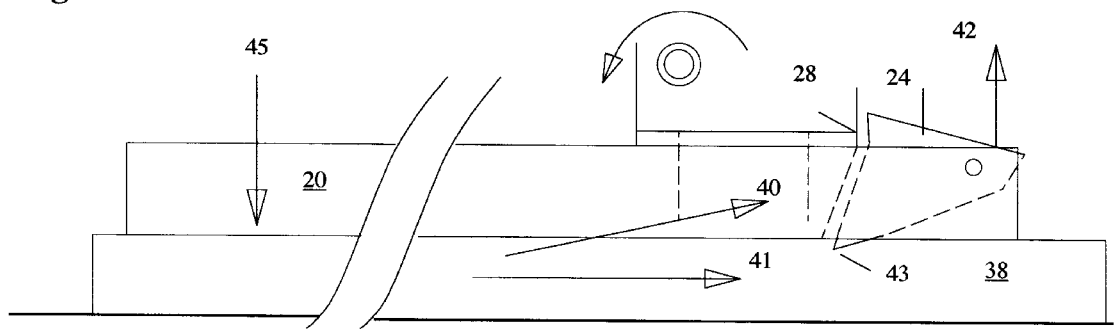
FIG. 9 is similar to FIG. 8 and shows the work piece partially rip-cut.

Adverting now to FIG. 9, a kick-back force 40 is applied to work piece 38 during rip-cutting. Kick-back force 40 comprises a rightwardly horizontal force 41 and a upwardly vertical force 42. If force 41 is great enough to begin to move work piece 38 rightward, pawls 24 will rotate counterclockwise until tip point 43 bites into work piece 38 and point 44 strikes bracket 28, thus preventing the further rightward motion of work piece 38. Force 42 will be countered by an equal, but opposite, force 45 from fixed holdown shoe 20.

Figure 10:
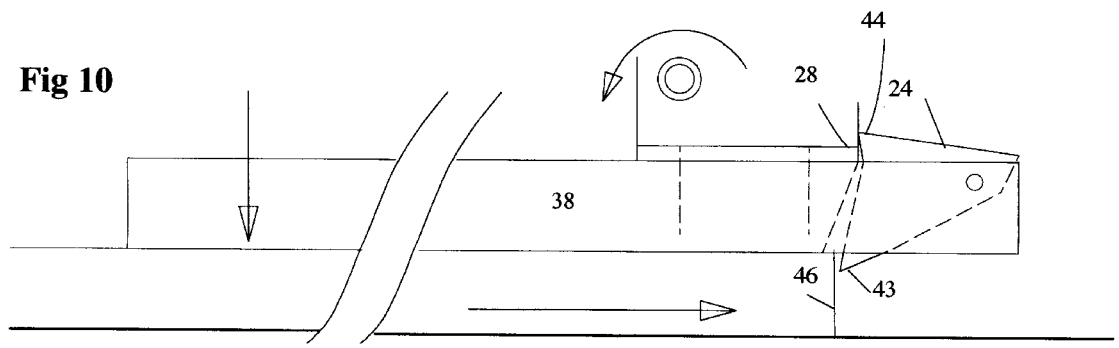
FIG. 10 is similar to FIG. 9 and shows the work piece advanced beyond the pawls.

FIG. 10 shows the operation of pawls 24 after the rightward end 46 of work piece 38 has passed pawls 24. In this case, pawls 24 rotates counterclockwise until point 44 strikes bracket 28. Thus, point 43 will prevent the rightward edge 46 from moving rightwardly past point 43 if a kick-back force is generated.

Figure 2:
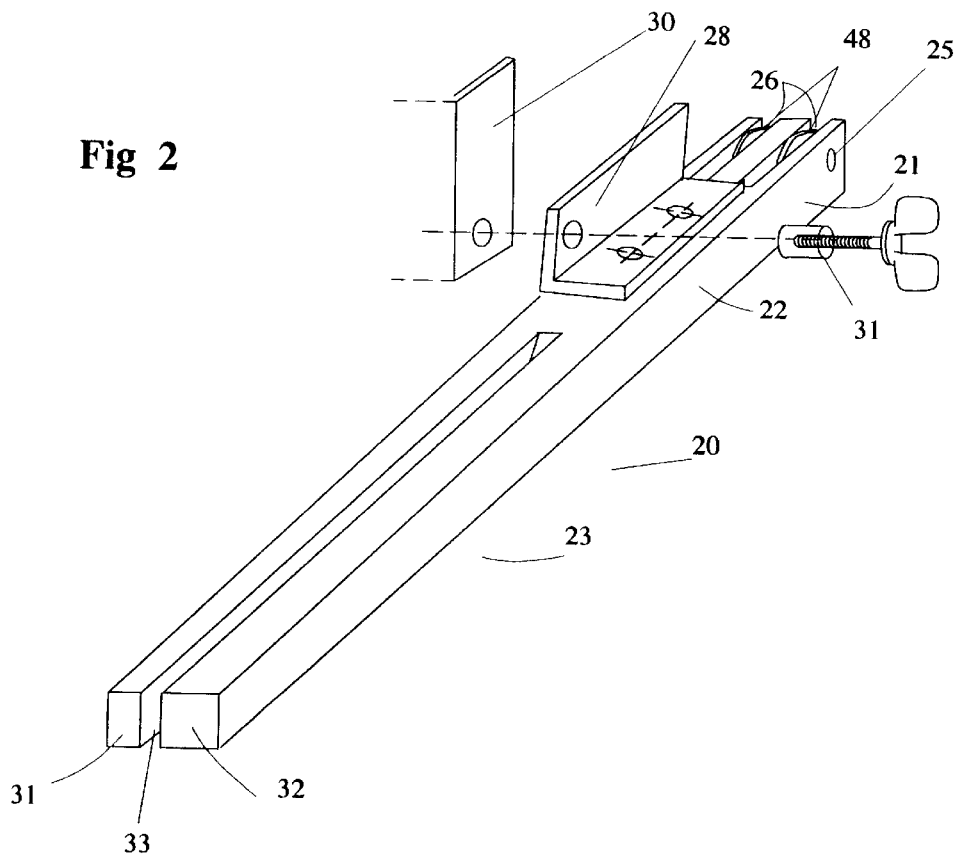
FIG. 2 is a perspective view of the invention having anti-kickback cams.

FIG. 2 shows a second embodiment of the invention incorporating anti-kickback cams, severally indicated at 48 in place of pawls 24.

Figure 11:
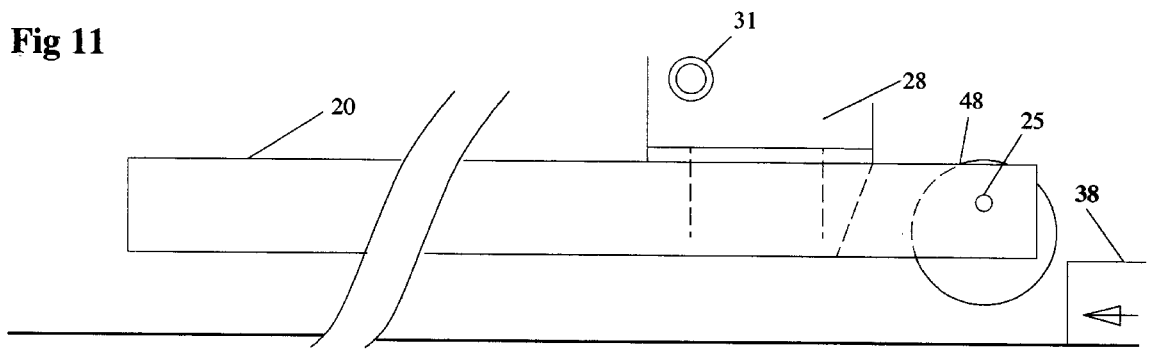
FIG. 11 is a schematic elevation view of the holdown shoe having anti-kickback cams.
Figure 12:
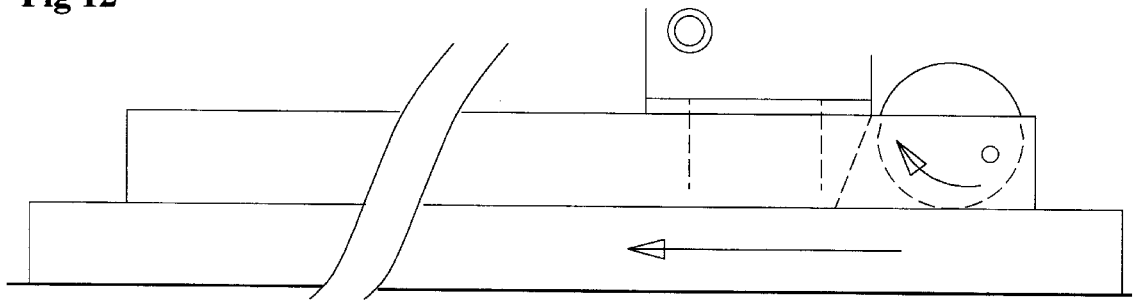
FIG. 12 is similar to FIG. 11 and shows a work piece advancing under the cams.
Figure 13:
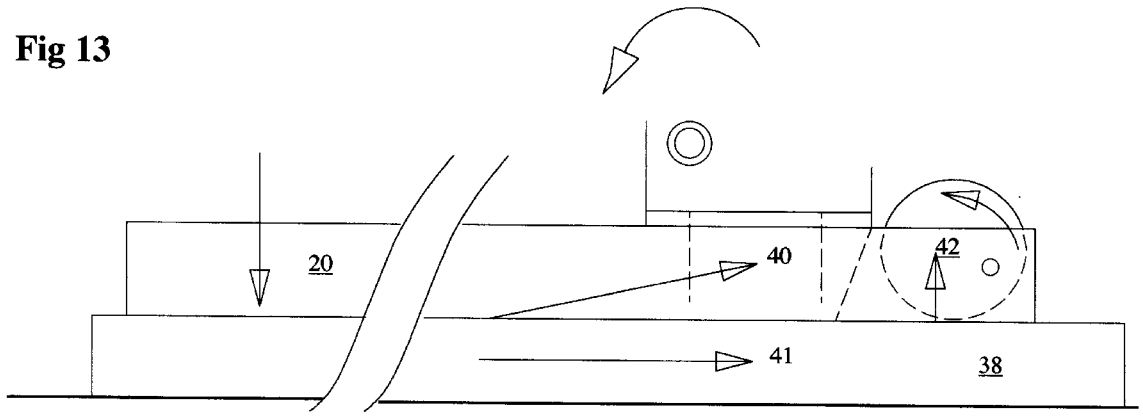
FIG. 13 is similar to FIG. 12 and shows the work piece partially rip-cut.
Figure 14:
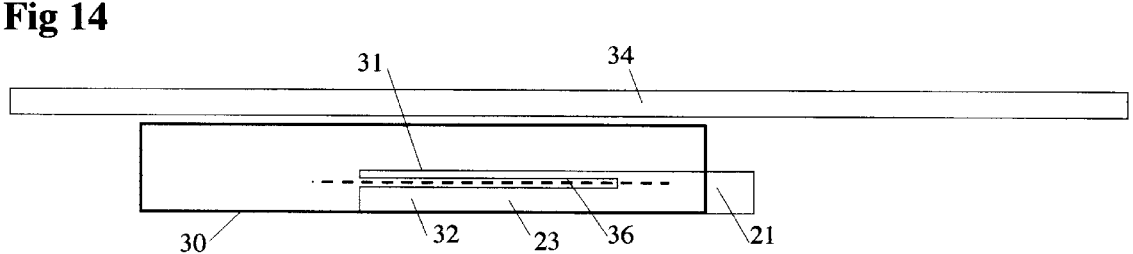
FIG. 14 is a top plan view of the holdown shoe mounted to a saw guard.

FIGS. 11–13 show the operation of anti-kickback cams 48 in assisting holdown shoe 20 to control kick-back. FIGS. 11 and 12 show that work piece 38 will rotate cam 48 clockwise as work piece 38 proceeds from right to left under holdown shoe 20. As shown in FIG. 13, the saw blade will impart a kick-back force 40 on work piece 38 as it is cut. Kick-back force 40 comprises a rightward horizontal force 41 in a upward vertical force 42. The rightward movement of work piece 38 can only occur if cam 48 rotates counterclockwise. If work piece 38 begins to travel upward or rightward, anti-kickback cam 48 will grip the surface of work piece 38 and cause a counterclockwise torque. The toe of holdown shoe 20 will apply a clamping force on work piece 38 which adds to the force under cam 48 assisting in preventing the lifting of work piece 38 from saw table 39. Force 42 will be countered by equal, but opposite, force 45 from fixed holddown shoe 20.

Modifications

The invention is not limited to the previously disclosed embodiments. Pawls 24 and anti-kickback cams 48 are only two of many items which can be added to holddown shoe 20 to assist it in controlling kickback. Therefore, while preferred forms of the holddown shoe have been shown and described, and various changes and modifications therein discussed, persons skilled in this art will readily appreciate that various additional changes and modifications maybe made without departing from the spirit of the invention, as defined and differentiated by the following claims.

We claim:

1. A bifurcated holddown shoe in combination with a radial arm saw adapted to cut a workpiece having a given height, comprising:

said radial arm saw including a saw table, circular saw blade having a given radius, and saw guard, said saw guard covering at least a portion of said blade, said saw blade having an active cutting portion;

said bifurcated holddown shoe having a mounting portion adjustably and fixably mounted to said saw guard, said bifurcated holddown shoe having an arm portion bifurcated into two arms separated by a channel such that said saw blade is positioned in said channel, said arm portion having a length at least as great as said radius of said saw blade, said arm portion extending in a first direction away from said mounting portion, said bifurcated holddown shoe further having an anti-kickback portion extending in a second direction away from said mounting portion opposite said first direction, said arm portion and said anti-kickback portion having a contiguous flat bottom surface, said anti-kickback portion having at least one element which is moveable below said contiguous flat surface, said bifurcated holddown shoe being fixable to said saw guard such that said contiguous flat bottom surface is parallel to said saw table and spaced from said saw table by a distance equal to a height of said workpiece, such that said arm portion provides vertical restraint of said workpiece adjacent said active cutting portion of said saw blade as said workpiece passes under said arm portion, and such that said anti-kickback portion prevents a kicking of said workpiece in said second direction when said workpiece is fed in said first direction.

2. The bifurcated holddown shoe in combination with a radial arm saw as described in claim 1 wherein said arm portion is a cantilevered member, said arm portion having sufficient stiffness to prevent vertical movement of said work piece adjacent said active cutting portion of said saw blade.

3. The holddown shoe described in claim 1, wherein said mounting portion comprises a bracket having a first aperture adapted to register with a second aperture in said saw guard, and a nut-and-screw combination;

whereby said holddown shoe can be pivotally positioned about said registered apertures and fixed relative to said saw table by said nut-and-screw combination.

4. The holddown shoe described in claim 1, wherein said channel is slightly wider than said saw blade.

5. The holddown shoe described in claim 1, wherein said at least one element of said anti-kickback portion comprises pawls.

6. The holddown shoe described in claim 1, wherein said at least one element of said anti-kickback portion comprises cams.

\* \* \* \* \*